United States Patent
Möller et al.

(10) Patent No.: US 9,079,767 B2
(45) Date of Patent: Jul. 14, 2015

(54) COUNTERCURRENT GASIFICATION USING SYNTHESIS GAS AS THE WORKING MEDIUM

(71) Applicant: ECOLOOP GMBH, Goslar (DE)

(72) Inventors: Roland Möller, Bad Harzburg (DE); Leonhard Baumann, Aldersbach (DE)

(73) Assignee: ECOLOOP GMBH, Goslar (DE)

( * ) Notice: Subject to any disclaimer, the term of this patent is extended or adjusted under 35 U.S.C. 154(b) by 0 days.

(21) Appl. No.: 14/365,368

(22) PCT Filed: Dec. 7, 2012

(86) PCT No.: PCT/EP2012/005049
§ 371 (c)(1),
(2) Date: Jun. 13, 2014

(87) PCT Pub. No.: WO2013/087172
PCT Pub. Date: Jun. 20, 2013

(65) Prior Publication Data
US 2014/0367615 A1 Dec. 18, 2014

(30) Foreign Application Priority Data
Dec. 16, 2011 (DE) .......................... 10 2011 121 508

(51) Int. Cl.
*C01B 3/24* (2006.01)
*C01B 3/02* (2006.01)
(Continued)

(52) U.S. Cl.
CPC ... *C01B 3/02* (2013.01); *C10J 3/20* (2013.01); *C10J 3/22* (2013.01); *C10J 3/84* (2013.01);
(Continued)

(58) Field of Classification Search
USPC ........................................................ 423/650
See application file for complete search history.

(56) References Cited

U.S. PATENT DOCUMENTS

| 6,790,383 B2 | 9/2004 | Kim et al. |
| 2011/0005136 A1* | 1/2011 | Moller .............................. 48/209 |

FOREIGN PATENT DOCUMENTS

| DE | 10 2006 023 259 | 11/2007 |
| DE | 10 2007 054 343 | 5/2009 |

(Continued)

OTHER PUBLICATIONS

International Search Report for PCT/EP2012/005048 dated May 8, 2013.
(Continued)

*Primary Examiner* — Melvin C Mayes
*Assistant Examiner* — Kenneth Vaden
(74) *Attorney, Agent, or Firm* — Nicholas Trenkle; Stites & Harbison, PLLC

(57) ABSTRACT

The invention relates to an autothermal method that is used for the continues gasification of carbon-rich substances (A) in a vertical process chamber (2) having a reduction zone (12) and an oxidation zone (6), in which the carbon-rich substances calcined in the reduction zone oxidize with oxygen-containing gas (8), wherein the gaseous reaction products (15) are drawn off at the top face of the vertical process chamber, the vertical process chamber is constructed in the form of a vertical shaft furnace, through which bulk material (3), which itself is not oxidized, flows continuously from top to bottom, wherein the carbon-rich substances are added to the bulk material before entering into the vertical process chamber. According to the invention, in order to be able to produce high-quality synthesis gas having a minimal fraction of inert gas without detrimentally influencing the energy efficiency of the countercurrent gasification, carbon monoxide-containing gas is introduced as cooling gas (10) into a cooling zone (11) at the lower end of the vertical shaft furnace.

26 Claims, 1 Drawing Sheet

(51) Int. Cl.
*C10J 3/22* (2006.01)
*C10J 3/20* (2006.01)
*C10J 3/84* (2006.01)
*C10K 1/02* (2006.01)

(52) U.S. Cl.
CPC ........... *C10K 1/02* (2013.01); *C01B 2203/0261* (2013.01); *C01B 2203/042* (2013.01); *C01B 2203/0877* (2013.01); *C01B 2203/0883* (2013.01); *C10J 2200/152* (2013.01); *C10J 2300/093* (2013.01); *C10J 2300/0916* (2013.01); *C10J 2300/0956* (2013.01); *C10J 2300/0959* (2013.01); *C10J 2300/0996* (2013.01); *C10J 2300/1223* (2013.01); *C10J 2300/1678* (2013.01); *C10J 2300/1684* (2013.01); *C10J 2300/1693* (2013.01); *C10J 2300/1823* (2013.01); *C10J 2300/1884* (2013.01); *Y02E 20/12* (2013.01)

(56) References Cited

FOREIGN PATENT DOCUMENTS

DE  10 2007 062 414  7/2009
WO  WO 99/37739  7/1999

OTHER PUBLICATIONS

International Preliminary Report on Patentability PCT/EP2012/005049 dated Jul. 10, 2014.

\* cited by examiner

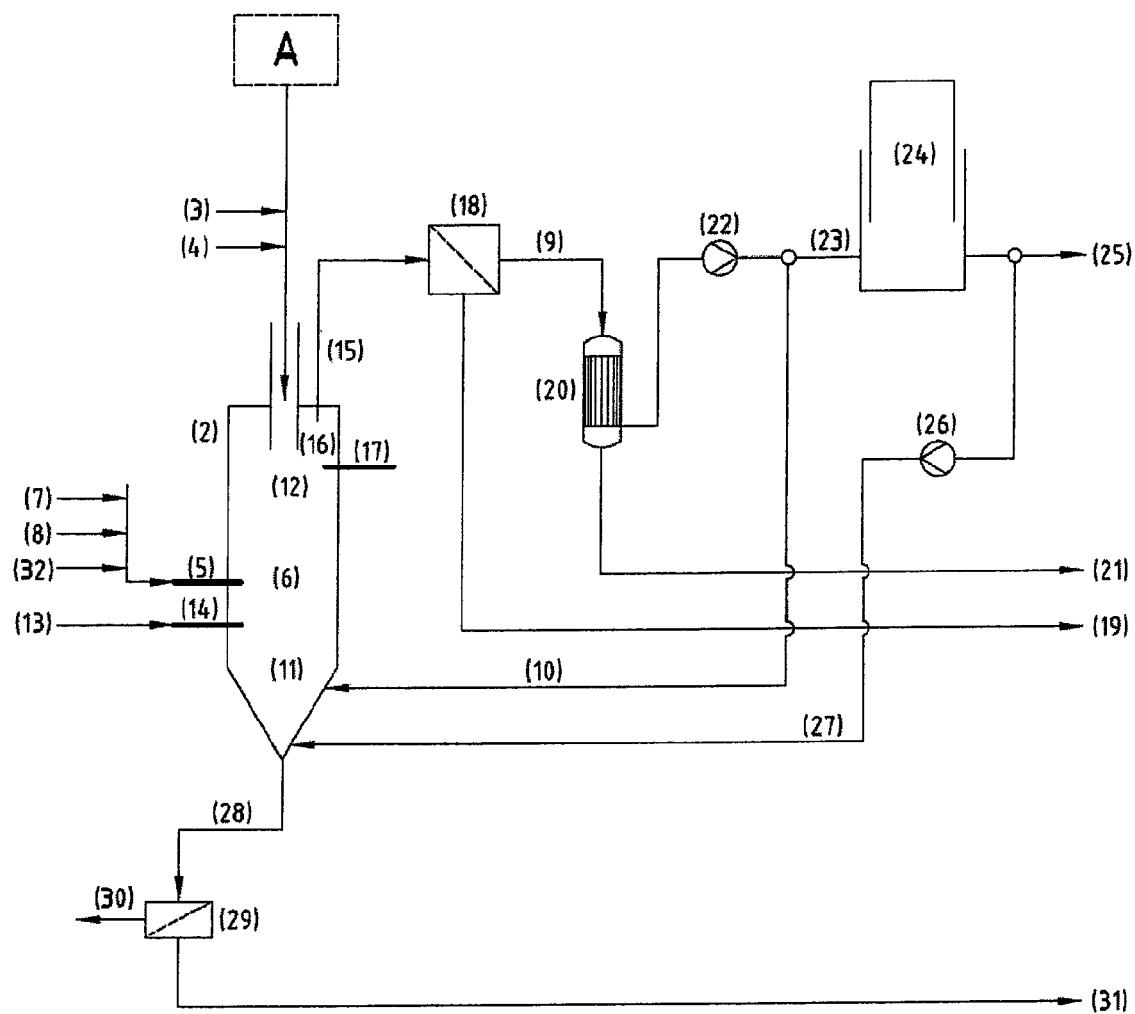

COUNTERCURRENT GASIFICATION USING SYNTHESIS GAS AS THE WORKING MEDIUM

The present invention relates to an autothermal process for continuous gasification of carbon-rich substances in a vertical process chamber having a reduction zone and an oxidation zone, in which zone the carbon-rich substances calcined in the reduction zone oxidize with oxygen-containing gas, and the gaseous reaction products are drawn off at the top of the vertical process chamber, the vertical process chamber being embodied in the form of a vertical shaft furnace, through which a bulk material, which itself is not oxidized, flows continuously from top to bottom, and the carbon-rich substances are added to the bulk material before it enters the vertical process chamber.

Such methods are already known and are performed for instance in countercurrent gasifiers. in which the resultant process gases flow around the coal products, or biomasses that are being moved toward the bottom of the gasifier. The resultant process gas can be combusted immediately or used for chemical syntheses. A disadvantage of the method described is that although because of the carbon-rich substances supplied it can be performed autothermally, nevertheless the process gases depend to an extreme degree on the particular carbon-rich substances supplied, and accordingly the method is hard to control. The method is entirely unsuitable with contaminated carbon-rich substances, such as fluorine- and chlorine-containing plastics, contaminated wastes, or the like.

The use of residue and waste materials in electric low-shaft furnaces is already known; in them at very high temperatures, calcium carbide, ferrosilicon, ferrochromium and the like can be produced in a more energy-saving way. However, such a method does not operate autothermally; instead, a considerable energy input by means of self-burning or self-baking electrodes is necessary to generate the requisite high temperatures. One such method is described for instance in German Patent Disclosure DE 10 2006 023 259 A1 and is directly linked to the production of the aforementioned substances.

A method of the type described at the outset is known from Austrian Patent Disclosure AT 387 786 B, which describes the use of a circulated bulk material which is not itself oxidized.

In DE 10 2007 062 414.1-24, a process of the type mentioned at the outset for gasification of carbon-rich substances is described, which proposes the conversion of the most various carbon bearers into synthesis gas, using a countercurrent gasifier. This process uses a bulk material, carried in circulation, as a reaction moving bed; preferably, alkaline substances, particular calcium oxide (CaO), are added as fine material, or all of the bulk material even comprises CaO. A further essential feature of this process is the development of a cooling zone, in which the requisite gasification media, such as air and/or water, are preheated in an energy-efficient way, while the bulk material carried in circulation is being cooled down. As a result, very high energy efficiency can be achieved; however, it is a disadvantage that only when air is used can a sufficient quantity of cooling gas for the method be furnished for adequately cooling all of the bulk material. Especially with the advantageous circulation of the bulk material, however, extensive cooling in the cooling zone is necessary, since only then is a separation of the polluted fine material and the remixing with carbon-rich substances, such as plastics, logically possible. The high proportion of nitrogen in the air then necessarily, as an inert gas ingredient, gets into the synthesis gas, thus massively reducing the calorific value of the synthesis gas and restricting its utility as a synthetic raw material or energy carrier. This creates a so-called weak gas, upon the use of which as an energy carrier, only reduced flame temperatures can now be achieved, and at the same time, because of the substantially higher gas quantities, geometric expansions of pipeline and burner systems are usually necessary as well.

For the present invention, the object has therefore become to improve methods of the type described above such that even high-quality synthesis gases with a minimal inert gas component can be produced, without adversely affecting the energy efficiency of the countercurrent gasification process.

This object is attained in a method of the type defined at the outset in that carbon monoxide-containing gas as cooling gas is introduced into a cooling zone at the lower end of the vertical shaft furnace.

It has been demonstrated that the use of carbon monoxide-containing gas, especially synthesis gas, as a cooling medium ensures efficient cooling of the bulk material in the cooling zone. The drawn-off gaseous reaction products can be used as synthesis gas, so that an internal partial circulation of the synthesis gas in the method is performed. It has proved especially advantageous that proportions of carbon dioxide typically present in the synthesis gas can be significantly reduced by the circulation as a result of renewed contact with carbon in the reduction zone of the countercurrent gasifier, because they are at least partly converted again into carbon monoxide by a Boudouard reaction.

A further embodiment of the invention can also comprise using, at least in part, process gases from carbothermic processes, for instance from blast furnaces for crude iron production or from the coking process of coal, as cooling gas. Process gases from electrothermic processes, for instance from electric low-shaft furnaces for calcium carbide production, can also be used.

Preferably, the bulk material in the vertical process chamber has a particle size of up to 30 cm.

It has been demonstrated that with such particle sizes, a stable bulk bed to be kept continuously in motion is easily attainable and at the same time has adequate gas permeability for the countercurrent of gas.

In a refinement of the method it is provided that the bulk material in the vertical process chamber is comprised entirely or in part of alkaline substances, for instance coarse calcium oxide, and/or for instance coarse calcium oxide or powdered calcium oxide and/or calcium hydroxide are admixed with these alkaline substances.

In coarse form, these substances enable adequate gas permeability of the moving-bed reactor, and these substances are suitable for binding pollutants, such as sulfur, halogens or heavy metals. The fine-grained or powdered embodiment is especially preferred, since in those cases a considerably larger reaction surface area is achievable, and alkaline substances can also be made available in the gas phase as pollutant binders.

When calcium oxide is used, the advantage is catalytic action in the gasification of organic materials. This catalytic action reduces the oil or tarlike products occurring otherwise in the gasification or coking to a minimum, and at the same the thermal cleavage ensues at lower temperatures and leads to a markedly increased yield of synthesis gas.

It is also advantageous if the vertical process chamber has a backup furnace in the vicinity of the oxidation zone, which backup furnace is operated via burner lances with fuel and with oxidation gas.

The backup furnace is employed on the one hand when the process is put into operation and on the other, in standardized operation, allows the local fixation of the oxidation zone in the shaft of the moving-bed reactor. The control can be done such that the oxidation gas can be effected [same problem as in 8594, where this seems to be the wrong verb] in the form of air and/or oxygen stoichiometrically or even superstoichiometrically relative to the fuel in the lances. As a result, the entire metering in of the quantity of oxidation gas required for the gasification process can be done via the lances.

The requisite oxidation gas quantity in the upstream moving-bed reactor can be effected by adding air and/or technical oxygen; the quantity of air or oxygen is adjusted such that overall the stages of the gasification, a total lambda of <1, preferably <0.7, and especially preferably <0.5 results. It is understood that with the proportion of oxygen in the oxidation gas quantity increased relative to air, the total gas throughput in the reactor can be reduced, and in closed circulation, even nitrogen enrichment need not be feared.

In order maximally to reduce the formation of oil- and tar-containing cleavage products from the catalytic action of the calcium oxide, gaseous reaction products in the presence of water vapor and calcium oxide and/or calcium carbonate and/or calcium hydroxide, a calcium-catalyzed reformation can be performed in the vertical process chamber and/or in the gas phase of the drawn-off gaseous reaction products above 400° C. In the process, substantial proportions of the resultant oil- and/or tar-containing cleavage products, which have a chain length of $>C_4$, are converted into carbon monoxide, carbon dioxide and hydrogen. The requisite water vapor can be purposefully metered into the vm and/or into the gas phase above the reduction zone. An embodiment in which water vapor is furnished in situ from the residual moisture of the organic materials is also advantageous. In that case, it may even be possible to dispensed with metering in water entirely.

The drawn-off gaseous reaction products are preferably cooled at least partially via a heat exchanger, before the return is made to the cooling zone. Preferably, before the cooling, the dust is separated out by means of physical separation methods, for instance via a filter system. The purposeful withdrawal of heat before the introduction into the cooling zone improves the total efficiency of the system and is a further step in overall optimization of the process.

If technical oxygen is used, then it is isolated from the air, for instance via physical separation methods, preferably operated by electric current, for instance by means of distillative air decomposition, pressure change absorption, or membrane separation methods and preferably temporarily stored in liquefied form. Alternatively, the technical oxygen can also be obtained via electrochemical methods, preferably by the electrolysis of water and/or carbon dioxide, and again it is then preferably temporarily stored in liquefied form.

Preferably, rom the air, besides technical oxygen, technical nitrogen is obtained in parallel from the air physical separation processes and preferably stored in liquid form in tank containers.

Depending on the separation method selected, in the production of the technical oxygen from air technical nitrogen can also be obtained, which is likewise temporarily stored in liquid form in tank containers; in other methods, technical hydrogen and/or carbon can also be obtained, as is the case in electrolysis of water and/or carbon dioxide, and again the hydrogen can be temporarily stored in gaseous form and the carbon can be temporarily stored in solid form.

Because of the capability of performing the physical separation methods and/or electrochemical methods with the aid of electric current, it is possible in a preferred refinement of the method to obtain this electric current from the excess current from weather-dependent power generation via wind power and/or solar energy, since the isolated substances can readily be temporarily stored in storage tanks in liquefied, gaseous or solid form for the performance of the method of the invention, so that energy overhangs that temporarily occur in the framework of national and/or global energy concepts can be well compensated for.

The aforementioned nitrogen, also obtained by the process of obtaining the technical oxygen, can be used as inertizing gas for purposes of starting up and shutting down the process, and/or for cleaning filter systems by means of gas impulses, but it is understood that uses in the context of other industrial applications are also possible.

The drawn-off gaseous reaction products are introduced into the oxidation zone at least in part as dilution gas via the burner lances, and the quantity of gaseous reaction products returned as dilution gas via the burner lances is preferably regulated via the temperature in the oxidation zone of the vertical process chamber as an actuating variable. The quantity of gaseous reaction products returned as cooling gas into the cooling zone is regulated via the temperature of the bulk material at the lower outlet of the vertical process chamber.

The gaseous reaction products are preferably drawn off from the vertical process chamber by means of a gas compressor, which is then used for the at least partial return of the gaseous reaction products into the oxidation zone and/or cooling zone of the vertical process chamber and/or for carrying the gaseous reaction products further to a downstream utilization and/or to a gas buffer container, and the return of the gaseous reaction products is furthermore effected via an additional gas compressor, for instance from a gas buffer container. In the cooling zone, water is additionally used as a cooling and/or gasification medium.

To avoid enrichment with pollutants in the process over the long term, it is preferred that bulk material, after leaving the cooling zone, is separated into various particle fractions by physical separation methods, preferably screening and/or sifting, and preferably the fine fraction, containing bound pollutants, is at least partially transferred outward from the process.

Below, one embodiment of the method will be described in further detail in conjunction with the accompanying drawing.

FIG. 1 shows as an example a preferred embodiment of the method of the invention. It is meant to explain the method but not to limit it.

A mixture of carbon-rich substances (A) in coarse form with a particle size of less than 30 cm is delivered to a countercurrent gasifier (2), which is embodied as a vertical process chamber, from above via a vertical chute. Coarse bulk material (3), for instance coarse calcium oxide, is admixed with these carbon-rich substances before entry into the countercurrent gasifier (2). For later binding of the pollutants contained in the organic materials, such as chlorine and heavy metals, alkaline substances (4), preferably fine-granular calcium oxide, is mixed into the moving bulk material bed before entering the countercurrent gasifier (2).

The mixture of carbon-rich substances, coarse calcium oxide and alkaline substances flows from top to bottom through the vertical process chamber (2) by gravity. The countercurrent gasifier in its middle region has burner lances (5), which provide for constant-load firing in the vertical process chamber and for the stationary development of an oxidation zone (6). These burner lances can be operated with fossil fuels (7) and oxygen-containing gas (8). Alternatively to the fossil fuels, synthesis gas from the countercurrent gasifier (9) can also be used.

At the lower end of the vertical process chamber, synthesis gas (10), as carbon monoxide-containing gas from the countercurrent gasifier (2), is introduced as cooling gas. This gas serves first in a cooling zone (11) to cool down the bulk material before it leaves the vertical process chamber. In the process, the synthesis gas is preheated, while it continues to flow upward in the vertical process chamber.

The burner lances (5) are operated such that the quantity of oxygen-containing gas (8) is used superstoichiometrically relative to the fuel (7). Because of the resultant oxygen excess in the oxidation zone, the synthesis gas flowing out of the cooling zone (11) into the oxidation zone (6) is at least partly combusted and in the process forms further carbon dioxide and water vapor. In the process, the energy necessary for the gasification process is made available by means of the reaction heat released.

On the countercurrent gasification principle, the carbon dioxide and the water vapor from the synthesis gas combustion react with the coke, occurring from the organic materials, in the reaction zone (12), forming carbon monoxide and water vapor.

The quantity of synthesis gas is adjusted such that on the one hand the moving bulk material bed is completely cooled down in the cooling zone (11), and remaining embers are extinguished, and on the other, the highest possible proportion of the requisite process energy is covered via the synthesis gas.

The quantity of oxygen-containing gas introduced via the burner lances (5) is adjusted such that in the vertical process chamber, a total lambda of preferably less than 0.5 is established. As a result, initially an oxidation zone (6) develops, in which combustible components of the blast-furnace gas and residues of the organic material react with oxygen to form $CO_2$ and $H_2$. Farther up in the process chamber, there is less and less oxygen and thus finally only low-temperature carbonization can take place, until still farther upward, finally, all the oxygen has been consumed, and a reduction zone (12) develops, under completely reductive conditions.

Conversely, if one looks at the flow of the bulk material mixture, comprising carbon-rich substances, calcium oxide, and alkaline substances, from top to bottom, then what occurs first in the reduction zone (12) is drying of the possibly moist materials used, until an intrinsic temperature of 100° C. After that, the intrinsic temperature of the materials rises further, so that the gasification process of the plastics that for instance are also contained in the carbon-rich substances begins, and at an intrinsic temperature of up to 500° C., the formation of methane, hydrogen and CO ensues. After extensive degasification, the intrinsic temperature of the materials rises further as a result of the hot gases rising out of the oxidation zone (6), so that finally, the carbon-rich substances are completely degasified and now comprise only residual coke, so-called pyrolysis coke, as well as ash ingredients. In the vertical process chamber the pyrolysis coke along with the bulk material is transported farther downward, where along with the $CO_2$ components from the oxidation zone (6), it is converted at least partially into CO at temperatures above 800° C. in the reduction zone (12) by means of a Boudouard reaction. Some of the pyrolysis coke also reacts in this zone by the water-gas reaction with water vapor, which is likewise contained in the hot gases, forming CO and hydrogen.

Residues of the pyrolysis coke are finally oxidized at temperatures below 1800° C. in the oxidation zone (6) with the oxygen-containing gas (8) flowing in via the burner lances and thermally used.

The moving bulk material bed arrives, together with the remaining ash components, in the cooling zone (11).

Water (13) can also be metered into the cooling zone (11) via water lances (14), as a further cooling and gasification medium.

The synthesis gas formed in the vertical process chamber is extracted by suction (15) at the upper end, so that in the upper gas chamber (16) of the vertical process chamber, a slight underpressure of from 0 to −200 mbar is preferably established.

During the gasification process, depending on the quality of the substances used, considerable proportions of gaseous acidic halogen-containing gases, or halogens, can occur. It is therefore advantageous if alkaline substances (4) are admixed with the moving bulk material bed before entry into the vertical process chamber. Metal oxides, metal hydroxides or metal carbonates are especially suitable for this; the use of fine-granular calcium oxide is especially preferred, since because of its reactivity and large surface area it reacts spontaneously with the gaseous halogen compounds or halogens formed and in the process forms solid salts, which very predominantly are discharged from the vertical process chamber along with the synthesis gas that is extracted by suction. Still other pollutants, such as chlorine, hydrogen chloride or even volatile heavy metals, can also be bound very effectively to the calcium oxide and in the same way discharged from the process.

The synthesis gas extracted by suction contains dust, which essentially comprises the solid salts of halogens, fine-granular alkaline substances, further pollutants, and inert particles. The synthesis gas containing dust can be treated in the gas chamber (16) of the vertical process chamber, or at (15) after leaving the vertical process chamber, in the presence of water vapor and fine-granular calcium oxide at temperatures of above 400° C. This temperature can be established by means of suitable adjustment of the quantity of oxygen-containing gas (8) or by the heating capacity of the burner lances (5) in the oxidation zone (6). However, it is especially advantageous to use direct firing into the synthesis gas via burner lances (17), which are operated stoichiometrically with fuel and oxygen-containing gas or even with an excess of oxygen-containing gas. This thermal posttreatment in the presence of water vapor and calcium oxide ensures the breakdown of oils and tars still present in slight quantities in the synthesis gas, by means of catalytic action of the calcium oxide.

The synthesis gas containing dust is then freed of the dust at temperatures above 300° C. via hot gas filtration (18). The halogen-containing filter dust (19) is transferred outward of the process. In a preferred embodiment of the process, it is also possible for the filter dust, at least partially, to be admixed again with the bulk material at (4) in the form of fine-granular alkaline substances and thereby to achieve a partial circulatory motion of the filter dust.

The resultant synthesis gas (9) is practically halogen-free. It is cooled down by means of a gas cooler (20) and freed of condensates. The condensate (21) that occurs can be at least partly reused as a cooling and gasification medium in the vertical process chamber via the water lances (14).

The synthesis gas cooled in the gas cooler is drawn off from the countercurrent gasifier (2) at (15) by means of a gas compressor (22) and aspirated via a gas filter (18) and gas cooler (20) and then conveyed for further thermal or material utilization (23).

The gas compressor (22) can also optionally be used for conveying the partial flow of synthesis gas (10) for use as cooling gas in the cooling zone (11). This embodiment of the method is especially advantageous, since in that case the cooling gas compressor that is otherwise necessary can be dispensed with.

Depending on location conditions and the type of further use of the synthesis gas, it may be advantageous to carry the synthesis gas into a gas storage container (24). From there, the synthesis gas can be taken for further use (25). There is also the option of performing the metering of the partial synthesis gas stream (27) for use as cooling gas in the cooling zone (11) by means of an additional gas compressor (26).

The bulk material mixture (28) emerging at the lower end of the vertical process chamber essentially contains coarse-grained bulk material, ash residues, and fine-grained calcium oxide.

To remove bound pollutants and the ash, it is especially preferable to perform screening (29) of the bulk material mixture (28); the coarse fraction (30) is preferably re-used as bulk material at (3) in the countercurrent gasifier (2).

The fine screening fraction (31) contains residues of ash, bound pollutants, and fine-grained calcium oxide.

Here, in a preferred embodiment of the process, it is possible for the fine screening fraction at least partially to be admixed again as fine-granular alkaline substances with the bulk material at (4) and thereby to achieve a partial circulatory mode of the fine screening fraction.

An especially preferred embodiment of the method comprises using technical oxygen as the oxygen-containing gas at (8). As a result, a synthesis gas that is especially rich in calorific value can be generated. In order to lower the flame temperatures that have risen in the oxidation of technical oxygen, it can be advantageous to meter additional synthesis gas into the burner lances directly at (32) by means of the gas compressor (22) and/or the additional gas compressor (26).

The invention claimed is:

1. An autothermal process for continuous gasification of carbon-rich substances in a vertical process chamber having a reduction zone and an oxidation zone, in which zone the carbon-rich substances calcined in the reduction zone oxidize with oxygen-containing gas, and the gaseous reaction products are drawn off at the top of the vertical process chamber, the vertical process chamber being embodied in the form of a vertical shaft furnace, through which a bulk material, which itself is not oxidized, flows continuously from top to bottom, and the carbon-rich substances are added to the bulk material before it enters the vertical process chamber, characterized in that carbon monoxide-containing gas as cooling gas is introduced into a cooling zone at the lower end of the vertical shaft furnace wherein the carbon monoxide-containing gas is not air.

2. The process of claim 1, characterized in that as the cooling gas, at least in part the drawn-off gaseous reaction products, containing carbon monoxide, are introduced into the cooling zone.

3. The process of claim 1, characterized in that the bulk material in the vertical process chamber has a particle size of up to 30 cm.

4. The process of claim 1 characterized in that the bulk material in the vertical process chamber entirely or in part comprises alkaline substances.

5. The process of claim 1, characterized in that in the vertical process chamber and/or in the gas phase of the drawn-off gaseous reaction products, in the presence of water vapor and calcium oxide and/or calcium carbonate and/or calcium hydroxide, a calcium-catalyzed reformation of substantial proportions of the resultant oil- and/or tar-containing cleavage products, which have a chain length of greater than C4, into carbon monoxide, carbon dioxide, and hydrogen is performed at temperatures of above 400° C.

6. The process of claim 1, characterized in that the vertical process chamber has a backup furnace in the vicinity of the oxidation zone, which backup furnace is operated via burner lances with fuel and with oxygen-containing gas.

7. The process of claim 2, characterized in that the drawn-off gaseous reaction products are at least partly cooled via a heat exchanger, before the return into the cooling zone is effected.

8. The process of claim 7, characterized in that the drawn-off gaseous reaction products, before cooling via the heat exchanger, are first freed of dust by means of physical separation processes.

9. The process of claim 1, characterized in that as the oxygen-containing gas, technical oxygen and/or air enriched with technical oxygen is employed.

10. The process of claim 9, characterized in that the technical oxygen for the oxygen-containing gas is isolated from the air via physical separation.

11. The process of claim 9, characterized in that the technical oxygen for the oxygen-containing gas is obtained via electrochemical processes.

12. The process of claim 9, characterized in that the calorific value of the gaseous reaction products is adjusted via the oxygen content of the oxygen-containing gas by means of adjusting the ratio of technical oxygen and air.

13. The process of claim 10, characterized in that from the air, besides technical oxygen, technical nitrogen is obtained in parallel by physical separation processes.

14. The process of claim 11, characterized in that from water and/or carbon dioxide, besides technical oxygen, technical hydrogen and/or carbon is obtained in parallel by electrolysis.

15. The process of claim 10, characterized in that from the physical separation process, isolated substances are buffer-stored in liquefied, gaseous or solid form in storage tanks for use in the process.

16. The process of claim 13, characterized in that the nitrogen obtained in the process is used as inertizing for startup and shutdown purposes and/or for cleaning filter systems by means of gas impulses.

17. The process of claim 1, characterized in that the drawn-off gaseous reaction products are introduced into the oxidation zone at least in part as dilution gas via burner lances.

18. The process of claim 17, characterized in that the quantity of gaseous reaction products returned as dilution gas via the burner lances is regulated via the temperature in the oxidation zone of the vertical process chamber as an actuating variable.

19. The process of claim 2, characterized in that the quantity of gaseous reaction products returned as cooling gas into the cooling zone is regulated via the temperature of the bulk material at the lower outlet of the vertical process chamber.

20. The process of claim 1, characterized in that the gaseous reaction products are drawn off from the vertical process chamber by means of a gas compressor, which is then used for the at least partial return of the gaseous reaction products into the oxidation zone and/or cooling zone of the vertical process chamber and/or for carrying the gaseous reaction products further to a downstream utilization and/or to a gas buffer container.

21. The process of claim 20, characterized in that the return of the gaseous reaction products is effected via an additional gas compressor.

22. The process of claim 1, characterized in that in the cooling zone, water is additionally used as a cooling and/or gasification medium.

23. The process of claim 1, characterized in that the bulk material, after leaving the cooling zone, is separated into various particle fractions by physical separation methods.

24. The process of claim 23, characterized in that a particle fraction resulting from the use of the physical separation method is at least partly re-used as bulk material in an upstream moving-bed reactor.

25. The process of claim 1, characterized in that as the cooling gas, at least in part process gases from carbothermic processes, containing carbon monoxide, are introduced into the cooling zone.

26. The process of claim 1, characterized in that as the cooling gas, at least in part process gases from electrothermic processes, containing carbon monoxide, are introduced into the cooling zone.

\* \* \* \* \*